US011235354B2

(12) United States Patent
Moesslein et al.

(10) Patent No.: US 11,235,354 B2
(45) Date of Patent: Feb. 1, 2022

(54) METHOD FOR IDENTIFYING MATERIALS

(71) Applicant: Polysecure GmbH, Freiburg (DE)

(72) Inventors: Jochen Moesslein, Freiburg (DE); Daniel Kirchenbauer, Bollschweil (DE); Philip Katus, Freiburg (DE); Martin Fahr, Felixsee (DE)

(73) Assignee: Polysecure GmbH, Freiburg (DE)

( * ) Notice: Subject to any disclaimer, the term of this patent is extended or adjusted under 35 U.S.C. 154(b) by 9 days.

(21) Appl. No.: 16/310,476

(22) PCT Filed: Jun. 21, 2017

(86) PCT No.: PCT/DE2017/100524
§ 371 (c)(1),
(2) Date: Dec. 17, 2018

(87) PCT Pub. No.: WO2017/220079
PCT Pub. Date: Dec. 28, 2017

(65) Prior Publication Data
US 2019/0329297 A1    Oct. 31, 2019

(30) Foreign Application Priority Data

Jun. 21, 2016 (DE) .................. 10 2016 111 347.6
Apr. 24, 2017 (DE) .................. 10 2017 108 641.2

(51) Int. Cl.
*B29B 17/02* (2006.01)
*B07C 5/342* (2006.01)
*B29K 27/06* (2006.01)

(52) U.S. Cl.
CPC ............ *B07C 5/3427* (2013.01); *B29B 17/02* (2013.01); *B07C 2501/0054* (2013.01); *B29B 2017/0203* (2013.01); *B29B 2017/0279* (2013.01); *B29K 2027/06* (2013.01)

(58) Field of Classification Search
CPC ...... B07C 5/3427; B29B 17/04; G07D 7/205; G07D 7/1205; G09F 3/0297; C09K 11/7769; C09K 11/06; G01N 21/6408
See application file for complete search history.

(56) References Cited

U.S. PATENT DOCUMENTS

| | | | | |
|---|---|---|---|---|
| 5,201,921 A | * | 4/1993 | Luttermann | B07C 5/3427 209/3.3 |
| 2003/0021998 A1 | * | 1/2003 | Hubbard | G01N 21/6428 428/412 |
| 2005/0205846 A1 | | 9/2005 | Bley et al. | |
| 2006/0291772 A1 | | 12/2006 | Haiml et al. | |
| 2009/0266991 A1 | * | 10/2009 | Evans | G11B 23/281 250/362 |
| 2011/0261354 A1 | * | 10/2011 | Sinfield | G01J 3/0291 356/301 |
| 2012/0256409 A1 | | 10/2012 | Giering et al. | |
| 2013/0082173 A1 | * | 4/2013 | Cadieux, Jr. | G01N 33/2882 250/301 |
| 2013/0320237 A1 | * | 12/2013 | Cadieux | B65B 19/30 250/459.1 |
| 2014/0197335 A1 | * | 7/2014 | Jayasooriya | G01N 33/02 250/459.1 |
| 2014/0262966 A1 | * | 9/2014 | Cadieux, Jr. | G01N 21/643 209/3.3 |
| 2015/0068955 A1 | * | 3/2015 | Baque | B07C 5/3427 209/3.1 |
| 2017/0044432 A1 | | 2/2017 | Baque et al. | |

FOREIGN PATENT DOCUMENTS

DE    102005045375    3/2007
WO    2004102490    11/2004

OTHER PUBLICATIONS

PCT/DE2017/100524; PCT International Search Report of the International Searching Authority dated Oct. 12, 2017.

* cited by examiner

*Primary Examiner* — Patrick H Mackey
(74) *Attorney, Agent, or Firm* — Renner, Otto, Boisselle & Sklar, LLP

(57) ABSTRACT

The present invention relates to a method of identifying and/or distinguishing materials by means of luminescence, wherein at least one luminescent substance is incorporated into the material and/or applied onto the material and the luminescence behaviour of the substance is analysed after excitation by means of radiation, and the use thereof for identifying and/or sorting and/or recycling and/or authenticating and/or performing a quality check and/or formulation check on materials.

21 Claims, No Drawings

METHOD FOR IDENTIFYING MATERIALS

The present application is a U.S. National Stage Application based on and claiming benefit and priority under 35 U.S.C. § 371 of International Application No. PCT/DE2017/100524, filed 21 Jun. 2017, which in turn claims benefit of and priority to German Application No. 10 2016 111 347.6 filed 21 Jun. 2016 and German Application No. 10 2017 108 641.2 filed 24 Apr. 2017, the entireties of which are hereby incorporated herein by reference.

TECHNICAL FIELD

The present invention relates to a method of identifying and/or distinguishing materials by means of luminescence.

BACKGROUND

There is a world-wide need to recycle plastics materials. For this purpose, the plastics materials have to be identified and separated in-grade. Optical methods for separating plastics materials are known. Similarly, sorting methods are known which are based on the targeted labelling of materials with luminescent substances. There is often a problem here that the plastics materials contain not only the plastics material which is usually substantially organic, but also other foreign substances, which may have an influence on the optical characteristics of the plastics material, such as absorption and fluorescence. These foreign substances may, for example, be pigments, dyes or other additives. The terms pigment and dye here are intended to be understood as also encompassing substances which interact with electromagnetic radiation beyond the visible spectrum. Use of the materials can also lead to changes in the optical properties, e.g. as a result of soiling. In addition, materials may also be subjected to ageing processes, e.g. by light, heat or chemical loads, which can lead to discoloration or cloudiness. The consequence of this is that plastics materials from the same chemical class (e.g. polyethylene terephthalate (PET)) can differ in their coloration for example. As a result of these differences, it may happen that absolute measurements of, for example, absorption, reflection or fluorescence at defined wavelengths or wavelength bands yield different results. This makes it much more difficult to achieve a uniform optical identification of these materials irrespective of the foreign substances contained therein, the degree of soiling, use or age.

It is therefore an object of the invention to provide a method of identifying and/or distinguishing materials, preferably plastics materials, which method is not impaired by characteristics of the material to be identified, such as discoloration, cloudiness or soiling.

If sorting methods are to be used which are based on the targeted labelling of materials with luminescent substances, the variety of the plastics materials to be sorted requires a large number of distinguishable markers. Many markers only exhibit unmistakable emission characteristics under special excitation conditions. In order to generate a wide variety of markers, it is therefore important to have the possibility of using a variety of excitation regimes.

Luminescent markers exist, for example, whose luminescence emission is a non-linear function of the excitation power, whereas the luminescence emission of other luminescent markers is proportional to the excitation power. Identifying these non-linear or linear connections therefore requires the use of a number of different excitation powers.

In addition, plastics materials can be mixed with different concentrations of one or more markers. By using fluorescent markers in different concentrations, different emission characteristics can be imparted to the labelled material. Identifying these different emission characteristics also requires special excitation conditions in each case and hence a wide variety of different excitation regimes.

It is therefore also advantageous to have a method of identifying and/or distinguishing materials, preferably plastics materials, which enables the excitation conditions to be modulated broadly.

In order to identify the different markers, it has to be possible to analyse the luminescence behaviour with respect to a wide variety of characteristics. These characteristics include, for example, the emission behaviour over time and the spectral emission behaviour.

SUMMARY AND DETAILED DESCRIPTION

The problem is solved in accordance with the invention by a method of identifying and/or distinguishing materials by means of luminescence, wherein at least one luminescent substance is incorporated into the material and/or applied onto the material and the luminescence behaviour of the substance is analysed after and/or during excitation by means of radiation.

It is preferable here that the luminescence behaviour is the luminescence emission behaviour over time.

It is likewise preferable that the luminescence emission is time-resolved.

It is also contemplated that after one or more time intervals, the intensity is determined for one or more emission wavelength(s) and intensity ratios are formed from the emission intensities for identical emission wavelengths or different emission wavelengths.

It is preferably contemplated that a decay constant is determined for one or more emission wavelengths.

It is preferable that an intensity profile of the complete emission spectrum over time is determined.

It is likewise preferable that the luminescence emission is integrated over a predetermined period of time.

It is also contemplated that the luminescence behaviour is a spectral emission behaviour.

It is contemplated that the emission behaviour is spectrally resolved.

It is preferable that a presence and/or absence of specific emission wavelengths is determined.

It is also preferable that an absolute intensity of specific emission wavelengths is determined.

It is further preferable that an intensity ratio between specific emission wavelengths and/or wavelength ranges is determined.

It is contemplated that an emission spectrum is determined.

It is likewise contemplated that the emission behaviour is spectrally integrated.

It is particularly preferably contemplated that the excitation of the luminescence is modulated by time and/or spectrally and/or by radiation intensity.

It is preferable that the excitation is modulated by time over a duration of a single excitation and/or a duration of the pulses in the case of multiply pulsed excitation and/or a duration of the interval gaps between pulses and/or the number of pulses.

It is contemplated that the excitation is modulated spectrally over the position of the excitation wavelength maximum and/or the width of the excitation wavelengths and/or the number of excitation wavelengths.

It is likewise contemplated that the radiation intensity is modulated via the power of the radiation source and/or by using optical filters.

It is preferable that the luminescence behaviour measured is associated with the excitation characteristics and assigned to a material.

It is preferable that the luminescence behaviour measured is associated with the excitation characteristics to form a mathematical evaluation criterion.

It is likewise preferable that the mathematical evaluation criterion found is compared with mathematical evaluation criteria stored in a database.

It is preferable according to the invention to use a method of identifying and/or sorting and/or recycling and/or authenticating and/or performing a quality check and/or formulation check on materials Also preferred is a method in which the luminescent substance is selected from the group of fluorescent materials and/or phosphorescent materials and/or up-converters and/or down-converters and/or materials which re-emit an excitation wavelength after excitation.

A method is also preferred in which the step of determining the luminescence characteristics is carried out in UV and/or VIS and/or IR.

In a further embodiment, it may be contemplated that the method of identifying and/or distinguishing materials is carried out when the materials are in motion. It is, for example, conceivable to place materials to be identified and/or to be distinguished in a guide tube which is held in a substantially upright position and to analyse the materials as they fall by means of detectors arranged in the guide tube. Movement of the materials to be examined can also be caused by placing the materials on a conveyor belt or the like. If the method of the invention is carried out using moving materials, both radiation excitation of the luminescent substance and an analysis of the luminescence behaviour of that substance can be performed while the materials are moving.

In a further embodiment, it is preferably contemplated to stop the movement of the materials to be examined for the analysis step, i.e. for excitation and/or detection. This short interruption of the movement of the materials to be examined may be achieved by, for example, stopping the conveyor belt—preferably briefly. In contrast to absolute measurements, it has surprisingly been found that relative measurements of optical characteristics, e.g. an analysis of the time behaviour of a luminescence emission, are insensitive to interference parameters such as additives or soil deposits. Identifying materials by exploiting relative luminescence characteristics is therefore not influenced by the inherent substantially optical characteristics of the material to be identified.

The luminescence characteristics or the luminescence behaviour can be based on luminescent substances from the group of fluorescent materials and/or phosphorescent materials and/or up-converters and/or down-converters and/or materials which re-emit an excitation wavelength after excitation. Luminescence is understood to mean the emission of electromagnetic radiation after the input of energy. It is preferable that the input of energy is effected by means of photons, so that the luminescence observed is photoluminescence. The photoluminescence can occur in UV and/or VIS and/or IR. Up-converters are luminescent substances which emit photons after excitation whose wavelength is shorter than the wavelength of the excitation photons.

Down-converters are luminescent substances which emit photons after excitation whose wavelength is longer than the wavelength of the excitation photons.

In the case of luminescent substances with an inorganic host lattice doped with two different types of ion, the intensity of the luminescence emission can be a non-linear function of the excitation power. On the other hand, the intensity of the luminescence emission of luminescent substances with an inorganic host lattice doped with only one species of ion can be proportional to the excitation power.

Materials according to the patent application DE102014105846A1, for example, can be used as up or down-converters.

One embodiment is characterised by the fact that in order to identify the material, luminescence emission behaviour over time is determined.

This means that after the end of or during the excitation, the emission of the luminescence is detected with measuring technology in a predetermined period of time. The detection with measuring technology can be performed once or several times in succession in the time interval after the excitation of the luminescence has been triggered. In this context, it may be contemplated to specify a fixed dead time between the end of the excitation and the beginning of the first measurement. The duration of the individual measurements and hence the time in which the absolute luminescence intensity is integrated may be identical or different. The duration of an individual measurement is 1 μs-10 ms, preferably 10 μs-1 ms, even more preferably 50 μs-500 μs. This method opens up a number of options.

After excitation, the luminescence intensity can be determined several times for one emission wavelength or a wavelength range at predetermined time intervals. Intensity ratios can be formed from the absolute intensities obtained. This can also be performed for a plurality of emission wavelengths or wavelength ranges, as a result of which these intensity ratios can be formed for a plurality of emission wavelengths or wavelength ranges. Similarly intensity ratios can be formed based on the emission intensities of different wavelengths or wavelength ranges.

It is also preferable that the decay constant is determined for one or more emission wavelengths or wavelength ranges. The decay constant is understood to mean the period of time in which the initial intensity of the emission drops to the 1/e-fold.

It is also preferable that the intensity profile of the complete emission spectrum over time is determined. The emission spectra obtained after different times can be set off against each other relatively.

According to the invention, it is also proposed to use a plurality of excitations followed by measurements with integration times of different lengths in order to determine the fluorescence intensity. Intensity ratios can be determined from the emission intensities obtained. This can be done for one or more emission wavelengths or wavelength ranges, in spectral resolution or spectrally integrated.

The absolute luminescence intensity can also be detected only once after or while the excitation is triggered. This can be done for one or more defined wavelengths or wavelength ranges in spectral resolution.

In this context, it is proposed that intensity ratios should be determined based on the absolute emission intensities of different wavelengths or wavelength ranges.

In order to identify materials, it is optionally possible to dispense with a step of determining relative luminescence characteristics. This is conceivable if the optical characteristics of the material are defined and homogeneous, if the optical characteristics of the material do not interfere with the excitation and emission wavelengths of the luminescent material markers, or if an impairment of the luminescence characteristics by ageing, use or soiling can be ruled out.

It is also preferable that the presence and/or absence of specific emission wavelengths or wavelength ranges is determined.

It is further preferable that the absolute intensity of specific emission wavelengths or wavelength ranges is determined.

A further embodiment is characterised by the fact that the intensity of the luminescence emission is integrated over the entire spectrum. This is advantageous if it is not necessary to distinguish different markers based on their different emission characteristics and/or if extremely weak emission signals have to be evaluated.

In order to detect the luminescence characteristics, various detectors, such as black-and-white cameras, colour cameras, photomultipliers, spectrometers, photocells, photodiodes, phototransistors for example, can be used alone or in combination. In the detection means, optical filters, such as long-pass/short-pass/bandpass filters, can be used.

A method is particularly advantageous in which the excitation of the luminescence is modulated by time and/or spectrally and/or by radiation intensity.

A preferred embodiment is characterised by the fact that the modulation of the excitation is performed over time by varying the duration of a single excitation and/or varying the duration of excitation pulses in the case of multiple excitation and/or by varying the duration of the pauses between excitation pulses in the case of multiple excitation and/or by varying the number of pulses in the case of multiple excitation.

In the case of multiple excitation, the number of pulses is advantageously 2-10, preferably 2-5. The duration of excitation is 1 µs-100 ms, 1 µs-5 ms, 10 µs-1 ms, even more preferably 20 µs-500 µs. When femtosecond lasers are used, the duration of excitation can also lie in the femtosecond range.

Pulsed excitation can also take the form of moving the material to be identified under one or more continuous light sources, e.g. by transporting it by means of a conveyor belt. A variation in the duration of the irradiation can be achieved by varying the speed of transportation.

One may also contemplate modulating the size of an excitation zone. If the material to be identified is transported continuously through an excitation zone at a fixed speed, e.g. a laser line, it is possible, by varying the width of the laser line, to vary the dwell time of the material in the excitation zone and hence to vary the duration of the irradiation.

A further preferred embodiment is characterised by the fact that the excitation is modulated spectrally by varying the position of the excitation wavelength maximum or maxima and/or by varying the width of the excitation wavelength or wavelengths and/or by varying the number of excitation wavelengths.

In the case of excitation with defined excitation wavelengths, the half-width is preferably 20 nm, preferably 10 nm, even more preferably 5 nm. In the case of excitation with wavelength ranges, the half-width may be 200 nm, preferably 100 nm, even more preferably 50 nm. The number of excitation wavelengths and wavelength ranges may be 10, preferably 5, even more preferably 2.

A further embodiment is characterised by the fact that the excitation intensity is modulated by varying the power of the radiation source and/or by varying optical filters between the excitation source and the material. The excitation intensity may be 0.01-1 W/mm$^2$, preferably 0.1 W/mm$^2$-0.5 W/mm$^2$, also preferably 0.0001-1 W/mm$^2$.

Wide and/or narrow-band sources can be used alone or in combination to excite luminescence, e.g. lasers, laser diodes, light-emitting diodes (LEDs), xenon lamps, halogen lamps. The excitation sources can be activated individually or simultaneously or sequentially in different combinations. In the excitation devices, optical filters, such as long-pass/short-pass/bandpass filters, can be used. In addition, it may be contemplated to vary the aperture of the excitation sources in order to modulate the size of an excitation zone though which material to be identified is transported. The excitation zone can also be modulated by arranging a plurality of excitation sources sequentially one after the other and varying the number of activated excitation sources in that arrangement.

In order to identify the materials according to the method presented, it is necessary to assign a connection between, on the one hand, the excitation regimes used or the emission characteristics measured and the labelled materials on the other.

It is preferable in this connection that excitation regimes and/or emission characteristics are associated to form a mathematical evaluation criterion. By means of experimental determination, it is possible to determine a mathematical target evaluation criterion for each material containing a particular marker and to store it in a database. When the identification method is carried out, the evaluation criteria obtained are compared with the evaluation criteria previously stored in the database, which makes identification possible.

The methods of the invention can be used for identifying and/or sorting and/or recycling and/or authenticating and/or performing a quality check and/or formulation check on materials.

The present invention will be further explained and described below with reference to specific illustrative embodiments.

ILLUSTRATIVE EMBODIMENT 1

Two types of PVC material, which had been labelled with two different luminescent substances, were used in a test facility simulating a recycling process. The luminescent markers were $Gd_{1.798}Yb_{0.2}Ho0.002O_3$ and $Y_{1.8992}Yb_{0.1}H_{0.0008}O_3$. The luminescent markers differ in the decay constant of the luminescence. The entire material was first coarsely comminuted by means of a hammer mill in order to obtain particle sizes of about 0.2 to 2.0 cm.

After comminution, the milled material was transported through a laser line in a sorting machine, as a result of which the luminescent markers incorporated were excited. Excitation was performed at 980 nm. The irradiation time was 1 ms. An optical detection system analysed and identified the decay constants of the luminescence of each particle of material. Based on the decay constant as the sorting criterion, expulsion nozzles were triggered and the particles of material were sorted into different containers according to the decay constant assigned to them. The particles of material were sorted by means of expulsion nozzles which are already present in conventional sorting lines.

ILLUSTRATIVE EMBODIMENT 2

Two types of object, in this case two different types of plastic container, which had been labelled with two different luminescent substances, were used in a test facility simulating a recycling process. The luminescent markers were $Gd_{1.82}Yb_{0.18}O_3$ (M1) and $Gd_{1.51}Yb_{0.49}O_3$ (M2). The luminescent markers differed in the decay constant of the luminescence.

The objects were transported through a laser line in a sorting machine, as a result of which the luminescent markers incorporated were excited. Excitation was performed at 980 nm. The irradiation time was 500 μs. An optical detection system analysed and identified the decay constants of the luminescence of each object. Based on the decay constant as the sorting criterion, the objects were sorted into different containers according to the decay constant assigned to them. The objects were sorted by means of equipment which is already present in conventional sorting lines.

ILLUSTRATIVE EMBODIMENT 3

Two types of PVC material, which had been labelled with two different luminescent substances, were used in a test facility simulating a recycling process. The luminescent markers were $Gd_{1.82}Yb_{0.18}O_3$ (M1) and $Gd_{1.51}Yb_{0.49}O_3$ (M2). The luminescence of marker M2 decays more quickly than the luminescence of marker M1.

After comminution, the milled material was transported through a laser line in a sorting machine, as a result of which the luminescent markers incorporated were excited. Excitation was performed at 980 nm. The irradiation time was 500 μs. An optical detection system detected the intensity of the luminescence emission I of each particle of material at the same emission wavelength at two successive times t1 and t2 and determined intensity ratios I t1/I t2. Since M2 decays more quickly than M1, the intensity ratio for M2 was greater than the intensity ratio for M1. Based on the intensity ratio as the sorting criterion, expulsion nozzles were triggered and the particles of material were sorted into different containers according to the intensity ratio assigned to them. The particles of material were sorted by means of expulsion nozzles which are already present in conventional sorting lines.

ILLUSTRATIVE EMBODIMENT 4

A luminescent material based on gadolinium oxysulphide, doped with erbium and ytterbium (M3) was treated thermally for about 60 minutes at about 1,650° C. This yielded the modified luminescent material M4. Because of the thermal treatment, the relationship between the luminescence intensity in the red spectral range and the luminescence intensity in the green spectral range changed (I $\lambda_{RED}$/I $\lambda_{GREEN}$). I $\lambda_{RED}$/I $\lambda_{GREEN}$ of M4 is greater than I $\lambda_{RED}$/I $\lambda_{GREEN}$ of M3.

Two types of PVC material, one type of which had been labelled with M3 and the other with M4, were used in a test facility simulating a recycling process. After comminution, the milled material was transported through a laser line in a sorting machine, as a result of which the luminescent markers incorporated were excited. An optical detection system detected the intensity of the luminescence emission I of each particle of material in the red and green spectral ranges and determined intensity ratio I $\lambda_{RED}$/I $\lambda_{GREEN}$. Based on the intensity ratio as the sorting criterion, expulsion nozzles were triggered and the particles of material were sorted into different containers according to the intensity ratio assigned to them. The particles of material were sorted by means of expulsion nozzles which are already present in conventional sorting lines.

ILLUSTRATIVE EMBODIMENT 5

Three types of PVC material, two of which had been labelled with different luminescent substances and one of which had not been labelled, were used in a test facility simulating a recycling process. The luminescent markers were $Gd_{1.82}Yb_{0.18}O_3$ (M1) and $Gd_{1.51}Yb_{0.49}O_3$ (M2).

After comminution, the milled material was transported through a laser line in a sorting machine, as a result of which the luminescent markers incorporated were excited. Excitation was performed at 980 nm. An optical detection system detected the intensity of the luminescence emission of each particle of material. Based on the intensity of the luminescence emission as the sorting criterion, expulsion nozzles were triggered and the particles of material were sorted into different containers according to the threshold intensity assigned to them. The particles of material were sorted by means of expulsion nozzles which are already present in conventional sorting lines. With an irradiation time of 350 μs, only the luminescence intensity of M1 was higher than the threshold intensity laid down as the sorting criterion. All that was sorted out, therefore, was the type labelled with M1. With an irradiation time of 500 μs, only the luminescence intensity of M1 and M2 was higher than the threshold intensity laid down as the sorting criterion. Both the type labelled with M1 and the type labelled with M2 were sorted out therefore. If the irradiation times of 350 and 500 μs are used sequentially in a multi-stage sorting process, the type labelled with M1 can be sorted out in the first step and the type labelled with M2 can be sorted out in the second step.

ILLUSTRATIVE EMBODIMENT 6

Three types of PVC material, two of which had been labelled with different luminescent substances and one of which had not been labelled, were used in a test facility simulating a recycling process. The luminescent markers were $Gd_{1.82}Yb_{0.18}O_3$ (M1) and 2,5-bis(5-tert-butyl-benzoxazole-2-yl)thiophene (M5). M1 was excited to luminesce by means of irradiation with IR light, while M5 was excited to luminesce by means UV light.

After comminution, the milled material was transported through a laser line in a sorting machine, as a result of which the luminescent markers incorporated were excited. The excitation of M1 was performed at 980 nm, and the excitation of M5 at 365 nm. An optical detection system detected the intensity of the luminescence emission of each particle of material. Based on the intensity of the luminescence emission as the sorting criterion, expulsion nozzles were triggered and the particles of material were sorted into different containers according to the threshold intensity assigned to them. The particles of material were sorted by means of expulsion nozzles which are already present in conventional sorting lines. When excitation was performed at 980 nm, only the luminescence intensity of M1 was higher than the threshold intensity laid down as the sorting criterion. All that was sorted out, therefore, was the type labelled with M1. When excitation was performed at 365 nm, only the luminescence intensity of M5 was higher than the threshold intensity laid down as the sorting criterion. All that was sorted out, therefore, was the type labelled with M5. If the two excitation wavelengths are used at the same time, the types labelled with M1 and M5 can be sorted out at the same time. If the different excitation wavelengths are used sequentially in a multi-stage sorting process, the type labelled with M1 can be sorted out in one sorting step and the type labelled with M2 can be sorted out in the other sorting step.

ILLUSTRATIVE EMBODIMENT 7

Three types of PVC material, two of which had been labelled with different concentrations of a luminescent substance and one of which had not been labelled, were used in a test facility simulating a recycling process. The luminescent marker was $Gd_{1.82}$ $Yb_{0.18}O_3$ (M1). Excitation of M1 was performed at 980 nm. At the same excitation wavelength, luminescence excitation of the material with the higher M1 concentration requires less excitation energy than luminescence excitation of the material with the lower M1 concentration.

After comminution, the milled material was transported through a laser line in a sorting machine, as a result of which the luminescent markers incorporated were excited. An optical detection system detected the intensity of the luminescence emission of each particle of material. Based on the intensity of the luminescence emission as the sorting criterion, expulsion nozzles were triggered and the particles of material were sorted into different containers according to the threshold intensity assigned to them. The particles of material were sorted by means of expulsion nozzles which are already present in conventional sorting lines. When the power of the radiation source was 0.1 $W/mm^2$, only the luminescence intensity of the material with the higher concentration of M1 was higher than the threshold intensity laid down as the sorting criterion. All that was sorted out, therefore, was the type labelled with the higher M1 concentration. With a power of 0.5 $W/mm^2$, the luminescence intensity of both types of labelled material was higher than the threshold intensity laid down as the sorting criterion. Both the type labelled with a high M1 concentration and the type labelled with a lower M1 concentration were sorted out therefore. If the powers of 0.1 $W/mm^2$ and 0.5 $W/mm^2$ are used sequentially in a multi-stage sorting process, the type labelled with a high M1 concentration can be sorted out in the first step and the type labelled with a lower M1 concentration can be sorted out in the second step.

ILLUSTRATIVE EMBODIMENT 8

Three types of PVC material, which had been labelled with different luminescent substances, were identified and sorted. The luminescent markers were $Gd_{1.82}$ $Yb_{0.18}O_3$ (M1), $Gd_{1.51}$ $Yb_{0.49}O_3$ (M2) and 2,5-bis(5-tert-butyl-benzoxazole-2-yl)thiophene (M5). The excitation of M1 and M2 was performed at 980 nm, and the excitation of M5 was performed using UV light. The luminescence excitation of M1 required less excitation energy than the excitation of M2.

The types were subjected to different excitation regimes, which differed in the intensity and the excitation wavelength. For each excitation regime, the luminescence behaviour of the types was measured. The analysis examined whether the luminescence intensity and the decay constant reached certain target values. It was possible to identify the types by comparing the pairs of excitation luminescence values obtained in this way with the pairs of excitation luminescence values determined experimentally and stored in the database. Table 1 provides a survey of the pairs of excitation luminescence values obtained. For each marker, a characteristic pattern of excitation regimes and achievement of target values results. That pattern allows the unambiguous identification of the marker obtained and hence the unambiguous identification and sorting of that type of material.

TABLE 1

| Excitation regime | Luminescence excitation | | | Target values (intensity, decay constant) achieved? | | |
|---|---|---|---|---|---|---|
| | 980 nm 0.1 $W/mm^2$ | 980 nm 0.5 $W/mm^2$ | UV | M1 | M2 | M3 |
| 1 | x | | | yes | no | no |
| 2 | | x | | yes | yes | no |
| 3 | | | x | no | no | yes |
| 4 | x | x | | yes | yes | no |
| 5 | x | | x | yes | no | yes |
| 6 | | x | x | yes | yes | yes |
| 7 | x | x | x | yes | yes | yes |

ILLUSTRATIVE EMBODIMENT 9

Three types of PVC material, two of which had been labelled with different luminescent substances (M1, M3) and one of which had not been labelled, were used in a test facility simulating a recycling process. The luminescent markers were gadolinium oxysulphide, doped with erbium and ytterbium (M3), and $Gd_{1.82}$ $Yb_{0.18}O_3$ (M1). The luminescence emission of M3 is a non-linear function of the excitation power, whereas the luminescence emission of M1 is proportional to the excitation power. Excitation of M1 and M3 was performed at 940 nm.

After comminution, the milled materials were twice irradiated with a laser in a sorting machine so that the luminescent markers incorporated were excited. An optical detection system detects the intensity of the luminescence emission of each particle of material at excitation intensities of P1=0.001 $W/mm^2$ and P2=0.005 $W/mm^2$. Any particles not labelled are detected because of the absence of any luminescence emission and are sorted out. The labelled particles (M1, M3) were sorted on the basis of the luminescence emission I1 at excitation intensity P1 and the luminescence emission I2 at excitation intensity P2. Sorting was performed sequentially by triggering expulsion nozzles at the target value assigned to them.

The features of the invention disclosed in the above description and in the claims can be essential to implementing the invention in its various embodiments both individually and in any combination.

The invention claimed is:
1. A method for identifying and/or distinguishing materials by means of luminescence, comprising:
   providing a material wherein at least one luminescent substance is incorporated into the material and/or applied onto the material,
   exciting the material by means of radiation,
   measuring and analyzing luminescence behavior of the substance after the excitation by means of radiation, wherein the luminescence behavior is luminescence emission behavior over time, and
   after one or more time intervals, determining emission intensity for one or more emission wavelength(s) wherein intensity ratios are formed from the emission intensity for identical emission wavelengths or different emission wavelengths.
2. The method as claimed in claim 1, wherein the luminescence emission is time-resolved.

3. The method as claimed in claim 1, further comprising determining a decay constant for one or more emission wavelengths.

4. The method as claimed in claim 1, further comprising determining an intensity profile of a complete emission spectrum over time.

5. The method as claimed in claim 1, further comprising integrating the luminescence emission over a predetermined period of time.

6. The method as claimed in claim 1 further comprising spectrally resolving the luminescence emission behaviour.

7. The method as claimed in claim 6, further comprising determining a presence and/or absence of specific emission wavelengths.

8. The method as claimed in claim 6, further comprising determining an absolute intensity of specific emission wavelengths.

9. The method as claimed in claim 6, further comprising determining an intensity ratio between specific emission wavelengths and/or wavelength ranges.

10. The method as claimed in claim 6, further comprising determining an emission spectrum.

11. The method as claimed in claim 1, further comprising integrating the luminescence emission behaviour.

12. The method as claimed in claim 1, further comprising modulating the excitation of the luminescence by time and/or spectrally and/or by radiation intensity.

13. The method as claimed in claim 12, wherein the excitation is modulated by time over a duration of a single excitation and/or a duration of the pulses in the case of multiply pulsed excitation and/or a duration of interval gaps between pulses and/or number of pulses.

14. The method as claimed in claim 12, wherein the excitation is modulated spectrally over position of the excitation wavelength maximum and/or width of the excitation wavelengths and/or number of excitation wavelengths.

15. The method as claimed in claim 12, wherein the radiation intensity is modulated via adjusting power of the radiation source and/or by using optical filters.

16. The method as claimed in claim 1, wherein the luminescence behaviour measured is associated with excitation characteristics and assigned to a material.

17. The method as claimed in claim 1, wherein the luminescence behaviour measured is associated with excitation characteristics to form a mathematical evaluation criterion.

18. The method as claimed in claim 17, wherein the mathematical evaluation criterion found is compared with mathematical evaluation criteria stored in a database.

19. The method as claimed in claim 1, wherein the luminescent substance is selected from the group of fluorescent materials and/or phosphorescent materials and/or up-converters and/or down-converters and/or materials which re-emit an excitation wavelength after excitation.

20. The method as claimed in claim 1, wherein the step of determining the luminescence characteristics is carried out in UV and/or VIS and/or IR.

21. A method for identifying and/or distinguishing materials by means of luminescence, comprising:
providing a material wherein at least one luminescent substance is incorporated into the material and/or applied onto the material,
exciting the material by means of radiation,
after one or more time intervals, measuring and analyzing luminescence behavior of the substance after the excitation by means of radiation, wherein the luminescence behavior is luminescence emission behavior over time, wherein a decay constant is determined for one or more emission wavelengths.

\* \* \* \* \*